H. N. HANCHETT & T. A. HALL.
NUT LOCK.
APPLICATION FILED AUG. 1, 1911.
1,033,581.
Patented July 23, 1912.
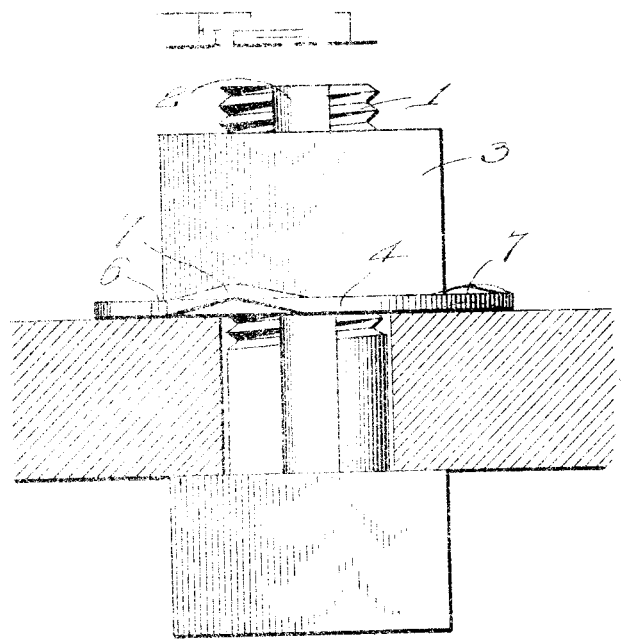
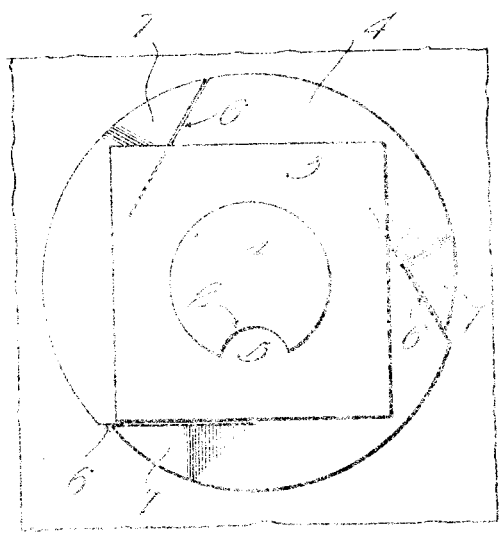
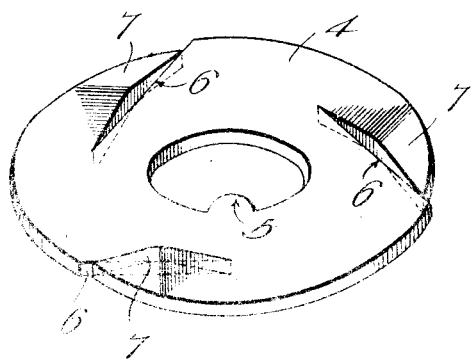
Inventors
H. N. Hanchett
and T. A. Hall
Attorneys

UNITED STATES PATENT OFFICE

HARRY N. HANCHETT AND THOMAS A. HALL, OF JACKSON, MICHIGAN.

NUT-LOCK.

1,033,581.

Specification of Letters Patent. Patented July 23, 1912.

Application filed August 1, 1911. Serial No. 641,710.

*To all whom it may concern:*

Be it known that we, HARRY N. HANCHETT and THOMAS A. HALL, citizens of the United States, residing at Jackson, in the county of Jackson and State of Michigan, have invented certain new and useful Improvements in Nut-Locks; and we do declare the following to be a full, clear, and exact description of the invention, such as will enable others skilled in the art to which it appertains to make and use the same.

This invention relates to improvements in nut locks.

One object of the invention is to provide a nut lock having an improved construction and arrangement of locking devices which are adapted to automatically engage the nut when the latter has been screwed to the desired position on the bolt.

Another object is to provide a nut lock of this character which will securely hold the nut against casual unscrewing but which will permit the removal of the nut by means of a wrench or other suitable tool.

A further and important object of the invention is in the provision of a washer constructed in such a manner that the nut to be secured is not only held in a locked position upon the bolt but is yieldingly engaged, as will appear from the detailed description to follow.

With these and other objects in view the invention consists of certain novel features of construction, and the combination and arrangement of parts as will be more fully described and claimed.

In the accompanying drawings: Figure 1 is a side view of a bolt and nut showing the application of the invention thereto; Fig. 2 is an end view of the same; and Fig. 3 is a detail perspective view of the locking washer.

Referring more particularly to the drawings, 1 denotes a bolt in one side of which is formed a longitudinally disposed groove 2 which preferably extends throughout the length of the bolt. Adapted to be screwed onto the bolt 1 is a nut 3 which may be of any desired construction.

Our improved lock comprises a washer 4 which may be of any suitable shape and which is here shown as being of circular form. In the opening of the washer is formed a tongue 5 which is adapted to fit into and slidably engage the groove 2 in the bolt thereby firmly holding the washer against turning on the bolt. At suitable intervals around its outer edge the washer 4 has formed therein slits or cuts 6 said slits being arranged tangential to the opening in the center of the washer. The material thus cut from the washer is bent upwardly as shown to form a series of spring locking pawls 7 the outer ends of which are turned or bent downwardly at an angle to form a beveled surface the purpose of which will be hereinafter described. By thus constructing the washer 4 it will be seen that when the same is applied to the bolt and the nut screwed on the latter and into engagement with the washer that the corners of the nut as the latter is turned will engage the upwardly bent pawls 7 thus depressing the same to allow the nut to screw up into tight engagement with the washer in which position the nut will be held by the engagement of the pawls with the sides of the nut, said pawls springing up after being depressed by the inwardly screwing movement of the nut. By bending the outer ends of the pawls inwardly at an angle a beveled surface is formed against which the nut may be turned when unscrewed by force with a wrench or other suitable tool thus depressing the pawls and permitting the nut to be removed from the bolt when desired.

As clearly shown the locking pawls 7 of the washer 4, are arranged in such a manner that one of the same will lock the nut, while the remaining tongues yieldingly bear against the inner surface of the same, whereby the said nut can be readily unscrewed from the bolt by an ordinary tool or wrench. In accomplishing the results referred to it is necessary that the tongues 7, should be bent outwardly at an acute angle intermediate their length, with their free ends therediate of in a plane with the washer of which they form a part.

From the foregoing description taken in connection with the accompanying drawings, the construction and operation of the invention will be readily understood without requiring a more extended explanation.

Having thus described our invention, what we claim is:

As an article of manufacture, the herein described nut lock comprising a washer having a plurality of yielding nut engaging pawls formed by slitting the washer tangentially to the opening therein, said pawls being bent at an acute angle intermediate their length the ends of which are in a plane with the washer, whereby any one of said pawls is adapted for engagement with a nut for locking the same, with the remaining ones in yielding contact with the nut, and a tongue projecting from the opening of the washer for preventing the same from turning upon a bolt.

In testimony whereof we have hereunto set our hands in presence of two subscribing witnesses.

HARRY N. HANCHETT.
THOMAS A. HALL.

Witnesses:
JOHN McDEVITT,
CLAUDE E. GROVE.